United States Patent
Ghaleb et al.

(10) Patent No.: US 10,901,711 B2
(45) Date of Patent: *Jan. 26, 2021

(54) METHOD FOR COMPILING CONCISE SOURCE CODE

(71) Applicant: KING FAHD UNIVERSITY OF PETROLEUM AND MINERALS, Dhahran (SA)

(72) Inventors: Taher Ahmed Ghaleb, Dhahran (SA); Khalid Abdullah Aljasser, Dhahran (SA); Musab A. Alturki, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 16/553,393

(22) Filed: Aug. 28, 2019

(65) Prior Publication Data

US 2020/0057615 A1 Feb. 20, 2020

Related U.S. Application Data

(63) Continuation of application No. 16/053,862, filed on Aug. 3, 2018, now Pat. No. 10,437,572.

(51) Int. Cl.
*G06F 8/41* (2018.01)
*G06F 8/36* (2018.01)
(Continued)

(52) U.S. Cl.
CPC ............ *G06F 8/437* (2013.01); *G06F 8/20* (2013.01); *G06F 8/35* (2013.01); *G06F 8/36* (2013.01);
(Continued)

(58) Field of Classification Search
USPC .......................................... 717/143
See application file for complete search history.

(56) References Cited

U.S. PATENT DOCUMENTS

| 6,973,640 B2 | 12/2005 | Little |
| 7,496,892 B2 | 2/2009 | Nuss |

(Continued)

OTHER PUBLICATIONS

Shi, Nija, and Ronald A. Olsson. "Reverse engineering of design patterns from java source code." 21st IEEE/ACM International Conference on Automated Software Engineering (ASE'06). IEEE, 2006. (Year: 2006).*

(Continued)

*Primary Examiner* — Wei Y Zhen
*Assistant Examiner* — Clint Thatcher
(74) *Attorney, Agent, or Firm* — Oblon, McClelland, Maier & Neustadt, L.L.P.

(57) ABSTRACT

Methods, systems, and computer readable media for compiling concise expressive design patterns within computer software source code are described. Some implementations can include methods and systems that resolve some problems of implementing design patterns in an OO and/or AO program. The disclosed technique facilitates writing programs that apply design patterns to its structure and behavior, in an easy manner. Some programming language constructs (associated with new keywords, syntax, and semantics) are disclosed that convey the goal of some design patterns in order to allow programmers to implement design patterns simply and concisely. These constructs are added as extensions to a compiler and a compiler-based approach to concise expressive design pattern source code is described.

8 Claims, 13 Drawing Sheets

(51) Int. Cl.
  G06F 8/20    (2018.01)
  G06F 8/35    (2018.01)
  G06F 40/284  (2020.01)
(52) U.S. Cl.
  CPC .............. *G06F 8/41* (2013.01); *G06F 8/42* (2013.01); *G06F 8/427* (2013.01); *G06F 40/284* (2020.01)

(56) References Cited

U.S. PATENT DOCUMENTS

| | | | |
|---|---|---|---|
| 8,156,474 | B2 | 4/2012 | Teplitsky |
| 2005/0166193 | A1 | 7/2005 | Smith et al. |
| 2008/0134138 | A1 | 6/2008 | Chamieh |
| 2009/0235238 | A1 | 9/2009 | Stoodley |
| 2009/0328012 | A1* | 12/2009 | Aharoni .............. G06F 9/45516 717/140 |
| 2010/0088674 | A1* | 4/2010 | Della-Libera ......... G06F 40/205 717/114 |
| 2010/0269089 | A1 | 10/2010 | Panicker et al. |
| 2011/0258595 | A1 | 10/2011 | Clevenger |
| 2012/0192143 | A1 | 6/2012 | Elaasar |

OTHER PUBLICATIONS

D. Hou and H. J. Hoover, "Using SCL to specify and check design intent in source code," in IEEE Transactions on Software Engineering, vol. 32, No. 6, pp. 404-423, Jun. 2006. (Year: 2006).*

Ghaleb, et al. ; Implementing the Observer Design Pattern as an Expressive Language Construct ; ICSEA 2015 : The tenth International Conference on Software Engineering Advances ; Information and Computer Science Department, King Fand University of Petroleum and Minerals ; 8 Pages ; 2015.

Aljasser ; Implementing design patterns as parametric aspects using ParaAJ: The case of the singleton , observer ,and decorator design patterns ; Computer Languages, Systems & Structures 45 (2016) 1-15 ; Information and Computer Science Department, King Fand University of Petroleum and Minerals, 2016 ; 15 Pages.

Bosch ; Design Patterns as Language Constructs ; University of Karlskrona/Ronneby, Department of Computer Science and Business Administration ; 22 Pages.

Budinsky, et al. ; Automatic code generation from design patterns ; IBM Systems Journal, vol. 35 No. 2, 1996 ; 21 Pages.

Lovatt, et al. ; A Pattern Enforcing Compiler (PEC) for Java: Using the Compiler ; Department of Computing, Macquarie University ; Australian Computer Science, Inc.. 2005 ; 10 Pages.

Hedin ; Language Support for Design Patterns using Attribute Extension ; Computer Science Department, Aarhus University ; May 1997 ; 16 Pages.

Monteiro, et al. ; Implementing design patterns in Object Teams ; Software: Practice and Experience (2012) ; 33 Pages.

Gomes, et al. ; Design Pattern Implementation in Object Teams ; CITI, Departmento de Informatica Faculdade de Ciencias e Technologia Universidade Nova de Lisboa, Portugal ; 2010 ; 2 Pages.

Sousa, et al ; Implementing Design Patterns in CaesarJ: an Exploratory Study ; CITI, Departmento de Informatica Faculdade de Ciencias e Technologia Universidade Nova de Lisboa, Portugal ; Mar. 31, 2008 ; 6 Pages.

Rajan ; Deign Patterns in Eos ; Computer Science Technical reports 314 ; Department of Computer Science, Iowa State University ; 2007 ; 13 Pages.

Hannemann, et al ; Design Pattern Implementation in Java and AspectJ ; University of British Columbia ; 2002 ; 14 Pages.

Gamma, et al ; Design Patterns Elements of Reusable Object-Oriented Software ; Addison-Weslet Professional Computing Series ; 1995 ; 354 Pages.

Avgustinov, et al.; "abc: An Extensible AspectJ Compiler"; Transactions on AOSD I; 2006 (Year: 2006).

* cited by examiner

| Singleton |
|---|
| - singleton |
| - Singleton( ) <br> + getInstance( ): Singleton |

FIG. 4

METHOD FOR COMPILING CONCISE SOURCE CODE

CROSS-REFERENCE TO RELATED APPLICATIONS

The present application is a Continuation of Ser. No. 16/053,862, now allowed, having a filing date of Aug. 3, 2018.

STATEMENT REGARDING PRIOR DISCLOSURES BY THE INVENTORS

Aspects of this technology were disclosed in Ghaleb T A, Aljasser K, AlTurki M A. Implementing the observer design pattern as an expressive language construct. *The Tenth International Conference on Software Engineering Advances, ThinkMind*, 2015; 463-469, which is incorporated herein by reference in its entirety.

BACKGROUND

Technical Field

The present disclosure is directed generally to computer software compilers, and, more particularly, to methods, computer readable media, and systems for compiling concise expressive design patterns within computer software source code.

Background

Object-oriented (OO) design patterns can include reusable software design and coding solutions that reorganize OO programs into a well-structured and reusable design (Vlissides J, Helm R, Johnson R, Gamma E. Design patterns: Elements of reusable object-oriented software. Reading: Addison-Wesley 1995; 49:120). Design patterns originally were implemented using OO features, such as polymorphism and inheritance. After Aspect-oriented (AO) programming languages emerged, researchers started to employ AO constructs to make the implementation more reusable and modular.

Despite the wide range of applications of design patterns, manually implementing them may lead to several problems including most notably implementation overhead, traceability and code reusability (Bosch J. Design patterns as language constructs. Journal of Object-Oriented Programming 1998; 11(2):18-32; incorporated herein by reference). For example, a programmer may be forced to write several classes and methods to achieve trivial behaviors, which can lead to sizable programming overhead, scattering of actions everywhere in the program, and reducing program understandability. Although design patterns make design reusable, the code (or at least part of the code) used to implement them may not be reused later, in some instances. Most design patterns have been implemented differently from one approach to another in the literature, while implementation of simple design patterns, like singleton and facade, varied only slightly. The more complex and widely used design patterns, such as observer and decorator, have had significantly different implementations from one approach to another.

Design patterns have been widely used in practice in many applications, for example, in the observer design pattern, the implemented scenario is conventionally one having a single subject with multiple observers, where the association of observers to subjects is subject-driven. For instance, implementations of the observer design pattern may be illustrated using the example of having Line, Point and Screen classes, where the observing protocol is implemented in a way that a single subject can have a list of observers (Hannemann J, Kiczales G. Design pattern implementation in Java and AspectJ. ACM Sigplan Notices, vol. 37, ACM, 2002; 161-173 and Rajan H. Design pattern implementations in Eos. Proceedings of the 14th Conference on Pattern Languages of Programs, A C M, 2007; 9:1-9:11; both incorporated herein by reference). This particular example actually shows a different case where many subjects (i.e., Lines and Points) can be observed by a single observer (i.e., Screen).

Another issue of conventional implementations of design patterns is concerned with the indirect ways of implementing them. Programmers in such approaches may not deal with the pattern as a recognizable unit in programs. Instead, they may be required to manually build certain protocols for each pattern and apply such protocols to each instance interested in utilizing those patterns, which can lead to increased dependencies in the programmer's code, which may sometimes make the code error-prone.

Some implementations of the present disclosure were conceived in light of the above mentioned problems and limitations of conventional programming techniques, methods and tools.

SUMMARY

Some implementations can include a method comprising obtaining a design pattern lexer supplement, and extending a lexer of a compiler using the design pattern lexer supplement. The method can also include extending grammar rules of the compiler to include one or more design pattern grammar extensions, and extending a parser/generator to include one or more design pattern extensions. The method can further include providing the compiler with a node factory including one or more design pattern nodes, and parsing source code containing one or more concise expressive design pattern source code elements using the parser/generator and the lexer.

The method can also include verifying syntax of the source code containing one or more concise expressive design pattern source code elements using the parser/generator, and performing semantic checking of the source code containing one or more concise expressive design pattern source code elements using the parser/generator. The method can further include translating the one or more concise expressive design pattern source code elements into one or more expanded design pattern source code elements using the parser/generator and input from the node factory.

In some implementations, the design pattern lexer supplement can include a list of tokens representing design pattern keywords as grammar terminals. The design pattern grammar extensions can include keyword definitions corresponding to tokens declared in a grammar. The one or more design pattern nodes include one or more of singleton nodes, observer nodes, or decorator nodes. The parsing can be performed with a parser/generator of the compiler.

The method can also include performing variable scoping of the source code containing one or more concise expressive design pattern source code elements. The method can further include performing type checking of the source code containing one or more concise expressive design pattern source code elements. The method can also include performing subsequent compiler passes of the expanded design pattern source code elements to compile the source code into compiled code.

Some implementations can include a non-transitory computer readable medium having instructions stored therein that, when executed by one or more processors, cause the one or more processors to perform a method. The method can include obtaining a design pattern lexer supplement, and extending a lexer of a compiler using the design pattern lexer supplement. The method can also include extending grammar rules of the compiler to include one or more design pattern grammar extensions, and extending a parser/generator to include one or more design pattern extensions. The method can further include providing the compiler with a node factory including one or more design pattern nodes, and parsing source code containing one or more concise expressive design pattern source code elements using the parser/generator and the lexer.

The method can also include verifying syntax of the source code containing one or more concise expressive design pattern source code elements using the parser/generator, and performing semantic checking of the source code containing one or more concise expressive design pattern source code elements using the parser/generator. The method can further include translating the one or more concise expressive design pattern source code elements into one or more expanded design pattern source code elements using the parser/generator and input from the node factory.

In some implementations, the design pattern lexer supplement can include a list of tokens representing design pattern keywords as grammar terminals. The design pattern grammar extensions can include keyword definitions corresponding to tokens declared in a grammar. The one or more design pattern nodes include one or more of singleton nodes, observer nodes, or decorator nodes. The parsing can be performed with a parser/generator of the compiler.

The method can also include performing variable scoping of the source code containing one or more concise expressive design pattern source code elements. The method can further include performing type checking of the source code containing one or more concise expressive design pattern source code elements. The method can also include performing subsequent compiler passes of the expanded design pattern source code elements to compile the source code into compiled code.

Some implementations can include a system comprising one or more processors coupled to a non-transitory computer readable medium having stored thereon software instructions that, when executed by the one or more processors, cause the one or more processors to perform operations. The operations can include obtaining a design pattern lexer supplement, and extending a lexer of a compiler using the design pattern lexer supplement. The operations can also include extending grammar rules of the compiler to include one or more design pattern grammar extensions, and extending a parser/generator to include one or more design pattern extensions.

The operations can further include providing the compiler with a node factory including one or more design pattern nodes, and parsing source code containing one or more concise expressive design pattern source code elements using the parser/generator and the lexer. The operations can also include verifying syntax of the source code containing one or more concise expressive design pattern source code elements using the parser/generator, and performing semantic checking of the source code containing one or more concise expressive design pattern source code elements using the parser/generator. The operations can further include translating the one or more concise expressive design pattern source code elements into one or more expanded design pattern source code elements using the parser/generator and input from the node factory.

The design pattern lexer supplement can include a list of tokens representing design pattern keywords as grammar terminals, wherein the design pattern grammar extensions can include keyword definitions corresponding to tokens declared in a grammar. The one or more design pattern nodes include one or more of singleton nodes, observer nodes, or decorator nodes.

The operations can also include performing variable scoping of the source code containing one or more concise expressive design pattern source code elements, and performing type checking of the source code containing one or more concise expressive design pattern source code elements. The operations can further include performing subsequent compiler passes of the expanded design pattern source code elements.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 4 is a diagram of an example singleton class in accordance with some implementations;

DETAILED DESCRIPTION

Figure 1:
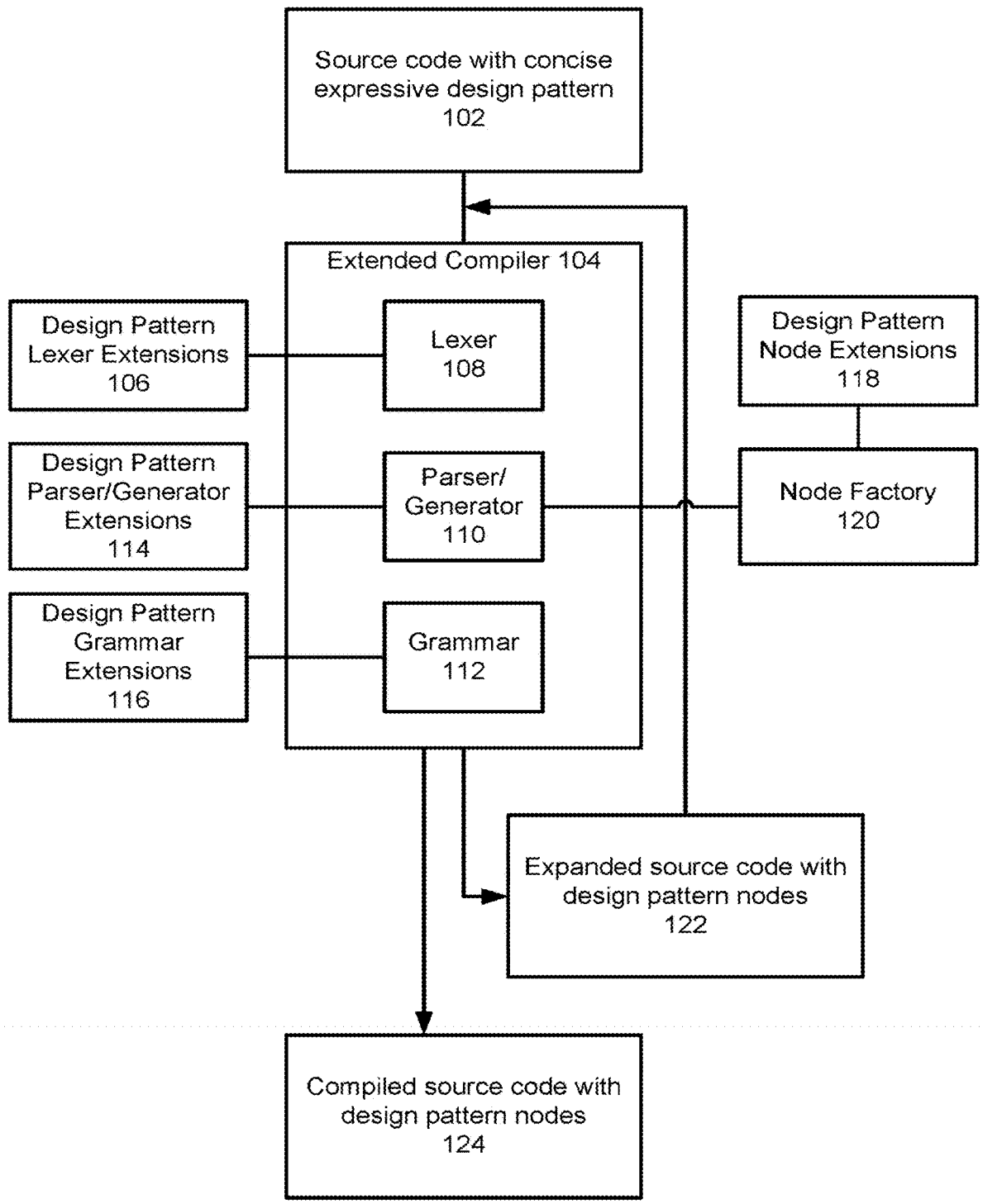
FIG. 1 is a diagram of an example concise expressive design pattern compiler environment in accordance with some implementations.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Aspects of this disclosure are directed to methods, systems, and computer readable media for compiling concise expressive design patterns within computer software source code. Some implementations can include methods and systems that resolve some problems of implementing design patterns in an OO and/or AO program. The disclosed technique facilitates writing programs that apply design patterns to its structure and behavior, in an easy manner. Some programming language constructs (associated with new keywords, syntax, and semantics) are built that convey the goal of some design patterns in order to allow programmers to implement the design patterns easily. These constructs are added as extensions to a compiler.

In general, some implementations can include methods, systems and computer readable media for a compiler approach to implementation of design patterns that are concise and expressive, which can lead to simpler, intuitive, and easier to apply source code. Some implementations can include a Java language extension. The application of design patterns using the disclosed techniques is more expressive and is significantly simplified compared to conventional design pattern coding. Thus, some implementations promote code correctness by reducing chances of making programming errors (both in the implementation of the pattern and the code using the pattern), resulting in increased productivity, enhanced modularity, and reduced dependencies between modules.

Some implementations can include, as a non-limiting example, an extension to Java/AspectJ using abc (Aspect-Bench Compiler) with the Polyglot frontend (Avgustinov P, Christensen A S, Hendren L, Kuzins S, Lhoták J, Lhoták O, De Moor O, Sereni D, Sittampalam G, Tibble J. abc: An extensible aspectj compiler. Transactions on Aspect-Oriented Software Development I. Springer, 2006; 293-334 and Nystrom N, Clarkson M R, Myers A C. Polyglot: An extensible compiler framework for java. Compiler Construction, Springer, 2003; 138-152, both incorporated herein by reference.). It will be appreciated that the techniques, methods, systems, and computer readable media described herein can be applied as extensions to, or integrated within, various computer languages and various software tools for compiling source code in those languages such as compilers, front ends, and/or other software development tools.

In order to illustrate the principles of the disclosed subject matter, three commonly used design patterns, namely singleton, observer, and decorator patterns, are described below as illustrations of the compiler approach of the present disclosure. These three patterns have been selected as examples, in part, because they involve a lot of concerns that have been discussed in the literature. The constructs and techniques disclosed herein can provide two levels of applications: class-level and instance-level. This can provide a technical solution and advantage to conventional techniques. For example, with respect to instance decorating discussed below, such a feature does not exist in the original AspectJ implementation of the decorator pattern described in the literature. Through an implementation of the subject matter described herein, the above-mentioned limitation is resolved.

In some implementations, a compiler approach to concise expressive design pattern software as described herein permits implementation of design patterns to be simpler, intuitive, and easier to apply. The application of design patterns as described herein may be more explicit and may be significantly simplified compared with some previous applications. Consequently, implementations of the disclosed subject matter can promote code correctness by reducing chances of making programming errors (both in the implementation of the pattern and the code using the pattern), resulting in increased productivity, enhanced modularity, and reduced dependencies between modules.

FIG. 1 is a diagram of an example concise expressive design pattern compiler environment 100 in accordance with some implementations. The environment 100 includes source code with concise expressive design patterns 102. Examples of the concise expressive design pattern source code elements are described below in connection with the singleton, observer and decorator examples.

The environment 100 also includes an extended compiler 104 including a lexer 108, a parser/generator 110, and a grammar 112. The extended compiler 104 may include other common compiler components that are not shown for clarity. The extended compiler 104 includes extensions that permit the extended compiler to compile concise expressive design pattern code elements as described herein.

The extensions can include design pattern lexer extensions 106 (or supplements). A first step in the disclosed compiler-based approach is to define appropriate keywords that will be used for implementing and applying design patterns in a concise and expressive manner. To this end, the lexer of the base compiler can be supplemented to include all potential keywords to be used in the proposed compiler-based approach. Extending the compiler lexer can be done in two phases. In the first phase, a list of tokens representing the approach keywords as grammar terminals is obtained (e.g., from memory or another system, etc.), as follows:

terminal Token SINGLETON, INSTANTIATE, AS, LET, OBSERVES, EXEC, DECORATE, WITH, TO;

The second phase, in an example, is done through a method called 'initLexerKeywords' inside the AbcExtension of the compiler-based approach, where the keywords are defined, added to the compiler lexer, and then linked with the tokens declared in the grammar, as follows:

```
public void initLexerKeywords(AbcLexer lexer)
{
    super.initLexerKeywords(lexer);
    // keywords "singleton", "instantiate", and "as" for the Singleton
    construct lexer.addGlobalKeyword("singleton", new LexerAction_c(new
    Integer(sym.SINGLETON))); lexer.addGlobalKeyword("instantiate", new
    LexerAction_c(new Integer(sym.INSTANTIATE)));
    lexer.addGlobalKeyword("as", new LexerAction_c(new Integer(sym.AS)));
    // keywords "let" and "observe" for the Observer construct
    lexer.addGlobalKeyword("observes", new LexerAction_c(new
```

```
        Integer(sym.OBSERVES))); lexer.addGlobalKeyword("let", new
        LexerAction_c(new Integer(sym.LET))); lexer.addGlobalKeyword("exec", new
        LexerAction_c(new Integer(sym.EXEC)));
        // keywords "decorates" and "with" for the Decorator construct
        lexer.addGlobalKeyword("decorate", new LexerAction_c(new
        Integer(sym.DECORATE))); lexer.addGlobalKeyword("with", new
        LexerAction_c(new Integer(sym.WITH))); lexer.addGlobalKeyword("to", new
        LexerAction_c(new Integer(sym.TO)));
        // keywords for other design patterns come here
        //...
        //...
}
```

The extensions can also include design pattern parser/generator extensions 114 and/or design pattern grammar extensions 116. Grammar is the set of formal rules that define how to construct new expressions of the language from a set of symbols. In programming languages, there are some formal method of describing syntax such as CFG, BNF, and EBNF. In the examples described herein, the AspectJ grammar is extended by modifying the parser of the language. For example, using abc and the Polyglot frontend, the extension is done by extending the PPG (Polyglot Parser Generator) which enables adding new and removing existing rules to or from the language. PPG internally uses the EBNF (Extended BNF) due to its usage in most of programming languages and its simplicity to demonstrate the syntactic forms.

In an aspect of the present disclosure, the compiler PPG grammar 112 is extended with new rules (e.g., 116) in order to capture the programmer's application of our new constructs. The new constructs could be provided as simple, but expressive, language keywords and statements. To this end, two major grammar rules have been extended to support parsing the new statements users may use to apply the intended design pattern. The first extended grammar rule is class_declaration, which will help in specifying the application of certain design patterns to class types at the time of application. For example, users, while declaring a class, can add modifier, say <singleton_decl>, to the class definition to tell the compiler that this particular class is applying this particular design pattern. The second rule to extend is statement_without_trailing_substatement, which permits users to create new instances or scenarios of the desired design pattern. For example, statements for instantiating an object of the singleton class observing a class, and decorating a class can be supported by the extended statements <instantiate_stmt>, <let_observes_stmt>, and <decorate_with_stmt>, respectively.

```
        extend class_declaration ::=
                <singleton_decl>
              | <facade_decl>
              | ..
              | ..
        extend statement_without_trailing_substatement ::=
                <instantiate_stmt
                >
              | <let_observes_stmt>
              | <decorate_with_stmt>
              | ..
              | ..
```

The three new statements rules are represented above as non-terminals, which means that they involve sub-rules as will be described below. Whenever the compiler comes across one of these sub-statements of the newly defined rules, it creates a new Node from the extended node factory 120 using the design pattern node extensions 118.

The node factory 120 can include the construction of all the nodes defined in Java and AspectJ as well as the design patterns nodes 118. Each node in the node factory 120 is built separately to capture the creation of the desired node based on the parameters passed from the PPG (i.e. in each rule of the PPG there is a call to a specific node the node factory and passing the actual parameters to that node). The node factory of our extension is created as follows:

```
public interface OurExtension NodeFactory extends AJNodeFactory
{
        public SingeltonClass SingeltonClass(Position pos,
             Flags flags, String name, TypeNode superClass,
             List<TypeNode> interfaces, ClassBody body);
        public SingletonInst SingletonInst(Position pos,
             TypeNode c, List o);
        public LetObserve LetObserve(Position pos, Expr
             observerName, HashMap subjectNames, HashMap
             execExprs);
        public LetObserve LetObserve(Position pos,
             TypeNode observerType, List
        subjectTypes); public DecorateWith
        DecorateWith(Position pos, Expr target,
             List params, Block body) ;
}
```

Figure 3A:
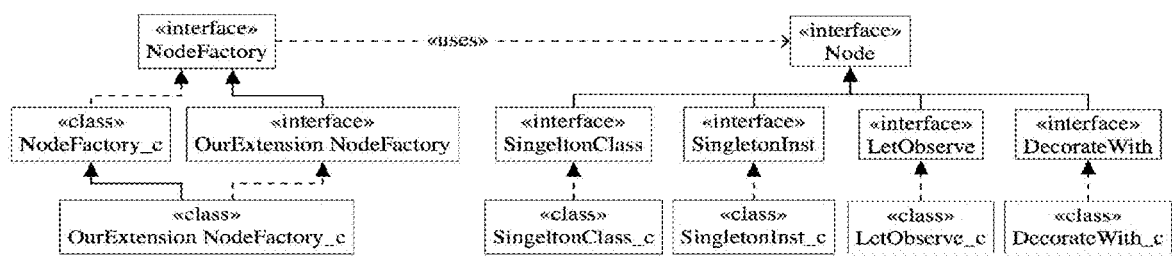
FIG. 3A is a diagram of an example node factory for building design pattern nodes within a compiler in accordance with some implementations.
Figure 3B:
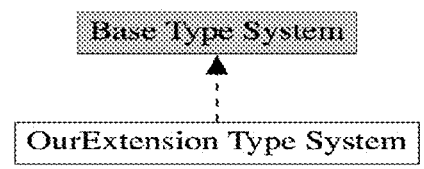
FIG. 3B is a diagram of an example type extension in accordance with some implementations.
Figure 3C:
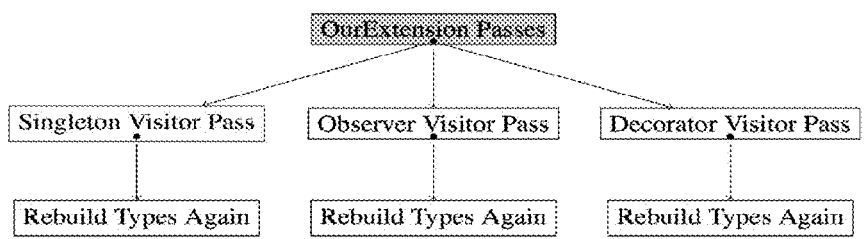
FIG. 3C is a diagram of a diagram showing an example compiler extension in accordance with some implementations.

The above interface presents the declaration of each node of the extension associated with its formal parameters. This node interface is then implemented by a class that will define the creation of those nodes as shown in FIG. 3A. Each node will be successfully constructed if and only if it conforms to the pre-defined syntax given in the PPG. If something goes wrong, the compiler will complain, stop processing, and show the necessary syntactic error messages to the screen. Whereas, if everything goes fine, the compiler immediately executes the next compiler pass. Example compiler extension passes are shown in FIG. 3C.

Type System

Figure 3D:
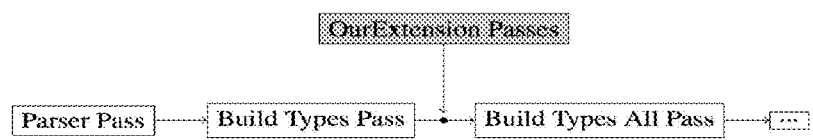
FIG. 3D is a diagram of example compiler extension passes in accordance with some implementations.

Each extension can have its own type system which might contain new types to be added to the original type system. In the disclosed compiler-based approach, types are introduced as extensions, as shown in FIG. 3B, to the existing base types of Java and AspectJ, for example. Types are automatically created via the type building pass at any point of compilation the compiler comes across one of our proposed constructs. The base compiler is not aware of the created types for design pattern compilation and requires them to be converted into proper types of the base type system. This is actually performed during another pass of the compiler that is carried out during compiler visits when new nodes are created and require new type to be added to the types stack, for example as shown in FIG. 3D.

Compiler Passes

Compiler passes are represented as a sequence of jobs that build, check and transform the abstract syntax tree (AST). In fact, abc (AspectJ) compiler passes are added as an extension to the polyglot compiler (Java) passes. In the same way, the compiler passes of the design pattern extensions have been added as extensions, e.g., as shown in FIG. 4D, to the abc passes in order to achieve the functionality of the design patterns implementation.

The singleton, observer, and decorator visits create new types to be pushed in the types stack at compile time. Therefore, the auto-generated types are built using a modified type building pass. Note that types built in the previous type builder pass are excluded from this pass.

Design pattern compiler passes are injected into the original abc compiler passes. For example, the parser and type building pass must be done before the execution of each pass. This is because observer and decorator statements work on the pre-defined types. After that, the compiler goes over one of the extension passes to, firstly, parse the new syntax of it, type check it, translate it into its corresponding AspectJ nodes, and then rebuild the new types of the created node again before proceeding to the next abc compiler passes, such as ambiguity remover. For example, after the source code containing concise expressive design pattern elements 102 is translated into expanded source code with design pattern nodes 122, one or more additional compiler passes may be performed on the expanded source code with design pattern nodes to arrive at compiled source code with design pattern nodes 124.

Figure 2:
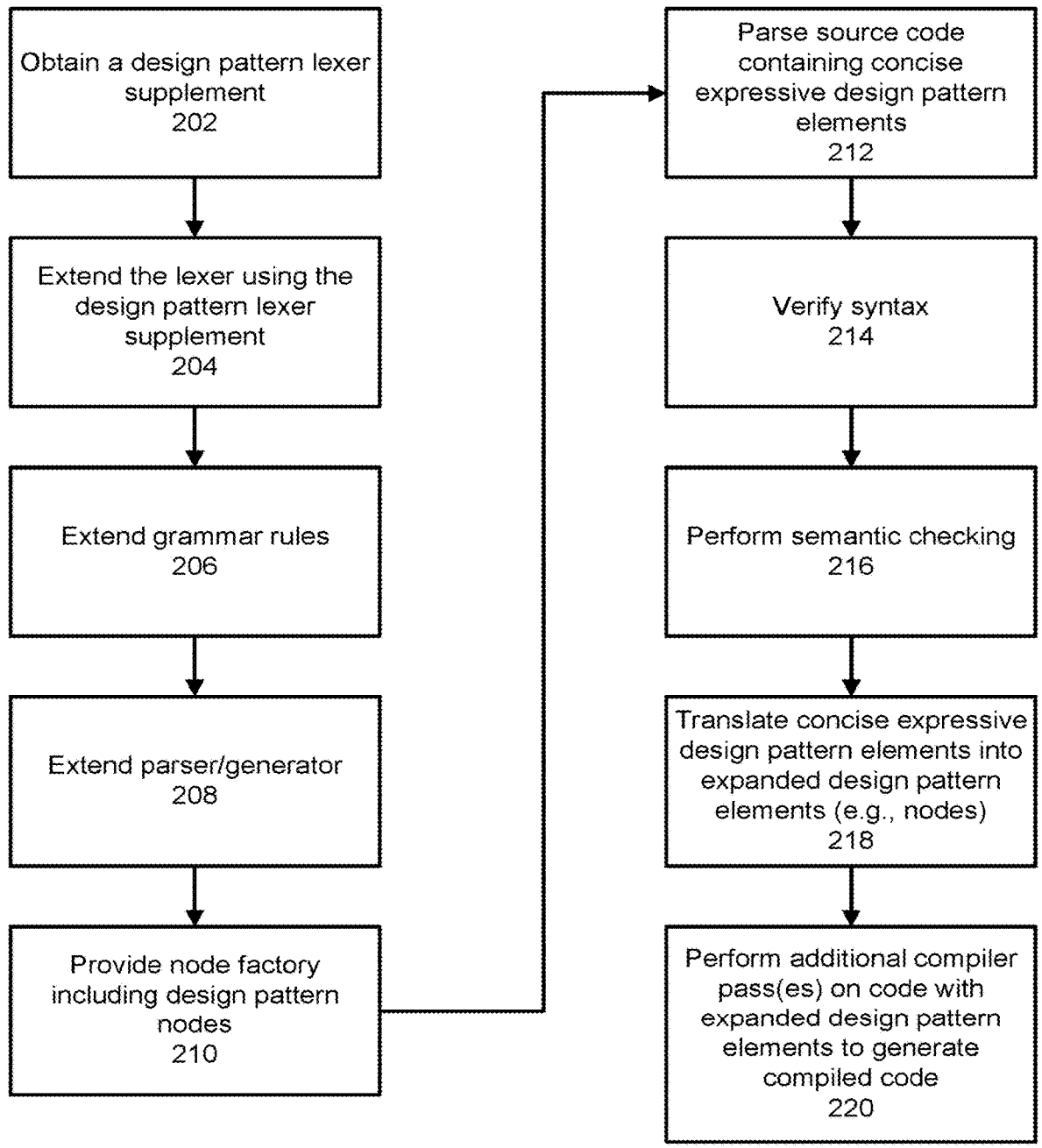
FIG. 2 is a flowchart of an example method for compiling concise expressive design pattern source code using a compiler extended in accordance with some implementations.

FIG. 2 is a flowchart of an example method for compiling concise expressive design pattern source code using a compiler extended in accordance with some implementations. Processing beings at 202, where a design pattern lexer supplement or extension is obtained. The design pattern lexer extension can include items discussed above in connection with 106. Processing continues to 204.

At 204, the lexer is extended using the design pattern lexer supplement (or extensions) obtained in 202. An example extension of the lexer is described above in connection with 106 and 108 of FIG. 1. Processing continues to 206.

At 206, the grammar rules are extended. Examples of grammar rule extension are described above in connection with 110-116 of FIG. 1. Processing continues to 208.

At 208, the parser/generator is extended. Examples of grammar rule extension are described above in connection with 110-116 of FIG. 1. Processing continues to 210.

At 210, a node factory is provided with design pattern nodes (or design pattern node extensions). For example, the node factory 120 of FIG. 1 is extended as described above to include design pattern nodes 118. Processing continues to 212.

At 212, source code containing concise expressive design pattern elements (e.g., 102, and the singleton, observer and decorator examples described below) is parsed by the extended compiler. Processing continues to 214.

At 214, the extended compiler verifies the syntax of the source code containing concise expressive design pattern elements. Processing continues to 216.

At 216, the extended compiler performs semantic analysis and checking on the source code containing concise expressive design pattern elements. Processing continues to 218.

At 218, the source code containing concise expressive design pattern elements is translated into expanded source code including design pattern nodes. Examples of the translation are described below. Processing continues to 220.

At 220, one or more additional compiler passes are performed on the expanded source code including the design pattern nodes (as described above).

Singleton Design Pattern Example

The singleton design pattern is a software design pattern that restricts the instantiation of a class to only a single object. This is preferable when exactly one object is required to maintain actions across the system. Singleton, as it is shown in FIG. 4, has a single public method that returns the sole object of the singleton class type, where the constructor of this class type is private so that it cannot be accessed from other classes.

The present disclosure approach provides a very concise construct for the singleton pattern. Using the disclosed singleton construct, a programmer can simply write the 'singleton' keyword while declaring classes intended to have only one instance. To get the sole instance of a singleton class, another construct is provided by the disclosed approach (called 'instantiate') to enable defining objects referring to that instance. The syntax of the singleton and instantiate constructs is given in the following EBNF notation:

```
<singleton_decl> ::= [<modifiers>] "singleton" "class" <class_id>
    ["extends" <super_class>] ["implements"
    <interfaces_list>]
    <class_body>
<instantiate_stmt> ::= "instantiate" <class_id> "as" <var_decls>;
```

As per the disclosed syntax, a user can only apply the singleton construct to a class, but not to the interfaces. This can apply classes including those extending super classes and/or implementing interfaces. This can also apply to static classes as well as inner classes that can be declared inside other classes. The instantiate construct can be used to define objects that refer to the sole instance of the singleton class, as shown in FIG. 5B, which means that the user can declare many objects referring to the same single instance of the classes.

The following example code snippet shows how the disclosed approach expressively abstracts and simplifies the use of the singleton pattern.

```
public singleton class Sing
{
    instantiate Sing as s1;
    public static void main(String[ ] args)
    {
        instantiate Sing as s2, s3;
    }
}
```

The class Sing is preceded by the 'singleton' modifier, which makes it accept only one instance to be created. To get a reference to that instance, the 'singleton' modifier can be used that gets a copy of the single instances of the class Sing and assigns it to variables.

After parsing the 'singleton' class declaration and matching it with the given syntax of the construct, the compiler then moves into other compilation passes that apply the semantics of the construct. On the other hand, the 'instantiate' statement is parsed by the extended compiler, checked syntactically and semantically, and then translated to a proper concrete implementation of the singleton pattern (e.g., an expanded version of the source code for the singleton pattern).

In the variable scoping compiler pass, the compiler works on 'instantiate' statements to verify that the singleton class being used is within the scope and could be accessed. In addition, instantiating objects with similar variable names in the same scope is normally not permitted in the base compiler and in the extensions to the compiler as well. Therefore, the disclosed technique inherits this functionality from the base class and applies it to the instantiation of all singleton copies.

In the type checking compiler pass, the extended compiler checks whether the 'singleton' keyword is used as a modifier of a class declaration (excluding interface declaration). If this is the case, the extended compiler moves on to the next pass; otherwise, it issues a syntax/semantics error. Moreover, abstract classes cannot have instances, and declaring them with the 'singleton' modifier will make a conflict in the semantics. Thus, the extended compiler takes this issue into account to help guarantee the avoidance of such a conflict.

If all previous checks are successful, the compiler converts the extended singleton nodes to their corresponding base nodes so they are normally passed by the base compiler. For example, the code generated from the example singleton application given above is show as follows:

```
public class Sing
{
    private static Sing singleInstance = new Sing( );
    private Sing( ){ }
    public static Sing getInstance( ){
        return singleInstance;
    }
    public static void main(String[ ] args)
    {
        Sing s1 =
        Sing.getInstance( ); Sing s2
        = Sing.getInstance( ); Sing
        s3 = Sing.getInstance( );
    }
}
```

It can be seen that the disclosed approach automatically generates the exact implementation of the class applying the singleton pattern. This generated code is considered to be error-free and semantically correct. Similarly, the creation of instance copies of that class are converted into their corresponding statements that return the sole instance of the class. Each instance variable is created using a separate statement, even if there is a single 'instantiate' statement with multiple objects.

Figure 5A:
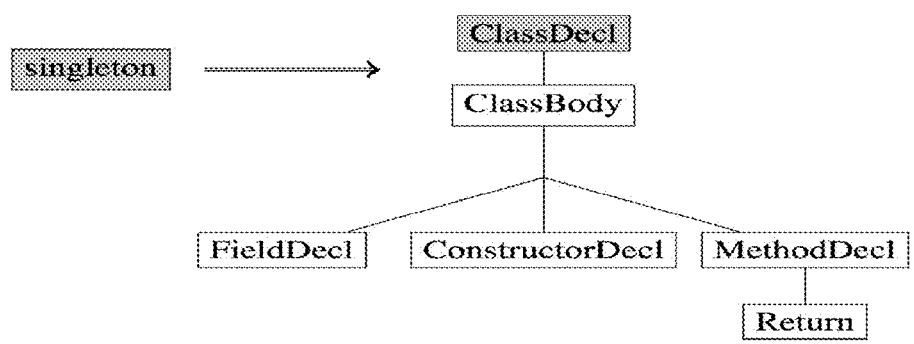
FIG. 5A is a diagram of an example conversion of a singleton node into a ClassDecl node in accordance with some implementations.
Figure 5B:
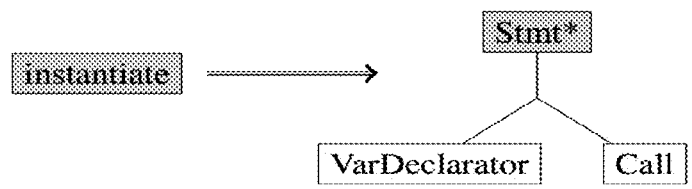
FIG. 5B is a diagram of an example singleton instantiation construct translation in accordance with some implementations.

In terms of AST nodes, the singleton class declaration node is translated to a typical class declaration node along with additional sub-nodes in its body, as shown in FIG. 5A. The additional nodes are concerned with the creation of the sole instance of the class and a public static method return that instance, in addition to making a private constructor of the class so that it cannot be accessed directly to prevent the creation of other instances.

As shown in FIG. 5A, the instantiation construct is also translated into a corresponding set of statements including a variable declaration and a method call to the publicly accessible method of the singleton returning the sole instance of the singleton class. For the case of having an instantiation of multiple copies of the single instance, multiple statements will be created, each per one instance copy.

Observer Design Pattern Example

The observer design pattern allows monitoring changes in some components of the program, called subjects, to notify other parts of the program, called observers. It consists of two main components: subjects and observers. In general, the observer pattern may define a many-to-many dependency between subjects and observers, in which changes in the states of subjects cause all their respective dependents (i.e., observers) to be notified and updated automatically.

Typically, however, the observer pattern represents the case in which a subject maintains a set of observers, and notifies them whenever it has changes in its state (i.e., one subject—many observers). This case is actually limited to one scenario in which the association of observers to subjects is made on basis of subjects. In other words, observing a list of subjects by an observer requires each of these subjects to utilize an individual observing protocol containing a single observer in its list. An alternative way to implement such a case would be to have another observing protocol that can associate a list of subjects for any interested observer (i.e., an observer-oriented protocol). Another problem of this implementation is the instance-level application in which every instance of an observer class has to explicitly be assigned to the observed subject. This could be better achieved using a class-level association of observers to subjects. A subject can be observed by a class, and then all instances of that class will implicitly be assigned to the list of observers of that subject.

Figure 6A:
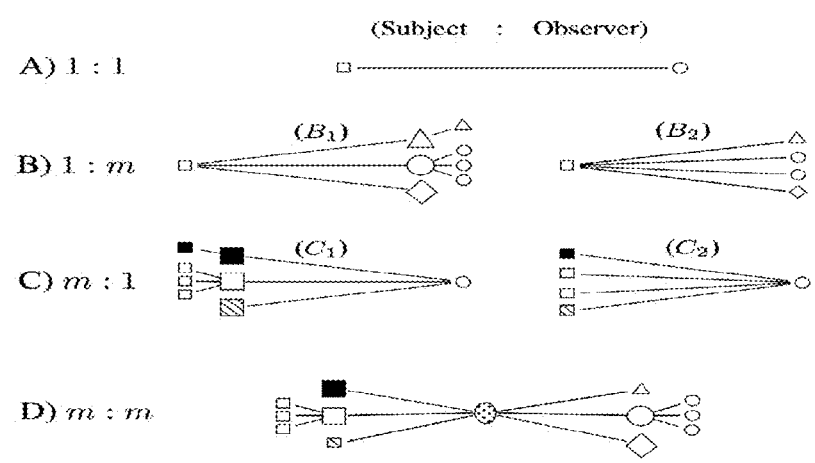
FIG. 6A is a diagram of example observer design pattern scenarios in accordance with some implementations.

FIG. 6A demonstrates a classification of the different scenarios of using the observer design pattern, in which small shapes are instances, and big shapes are classes. Some implementations of the observer pattern in AspectJ (compared with that in Java) are based on AspectJ constructs that improve modularity properties (see Hannemann J, Kiczales G. Design pattern implementation in Java and AspectJ. ACM Sigplan Notices, vol. 37, ACM, 2002; 161-173, incorporated herein by reference). Modularity is enhanced by localizing pattern implementation to make it reusable, maintainable and composable using the powerful aspect-oriented crosscutting facilities (Mehmood A, Jawawi D N. Aspect-oriented model-driven code generation: A systematic mapping study. Information and Software Technology 2013; 55(2):395-411 and Cacho N, SantâA˘Z' anna C, Figueiredo E, Dantas F, Garcia A, Batista T. Blending design patterns with aspects: A quantitative study. Journal of Systems and Software 2014; 98:117-139, both incorporated herein by reference). In the example below, the AspectJ implementation is used as a back-end implementation of example constructs.

The observer pattern construct is designed to be as abstract and modular as it could possibly be while maintaining high accessibility to programmers and users. Moreover, the construct allows applying all possible scenarios of the observer pattern expressively with the least amount of code. Its syntax is defined using the following EBNF notation:

```
<LetObserve>::= "let" <annotated_id_list>
    "observe" <extended_id_list>
    ["exec" <method_invocation>] ";"
```

The observer construct consists of three parts: (1) a list of one or more observers specified by a comma-separated list of class and/or object identifiers given by <annotated_id_list>, (2) a list of one or more subjects given by <extended_id_list> specified by a comma-separated list of any combination of class and object identifiers and attribute names or even the wildcard (*) to refer to all attributes within the subject to be observed; and finally (3) a single optional notification method given by the <method_invocation> non-terminal. Each of the two non-terminals <annotated_id_list> and <extended_id_list> has its own production rules defined in the extension (as shown below). The <method_invocation> and <name> non-terminals are already defined in the Java 1.2 parser for CUP employed by abc. The production rules that define the non-terminal <annotated_id_list> are given as follows:

<annotated_id_list>::= <id> {"," <id>}
<id>::= ("class" <name> | <name>)

where the class keyword is used to distinguish between class and object identifiers (especially when declared with the same names). The non-terminal <extended_id_list> defines an extension to the non-terminal <id>. This extension allows programmers to assign subject names, determine certain attributes of them to observe, or use the wildcard (*) to refer to all attributes within a subject to be observed, as follows:

<extended_id_list>::= <ext_id> {"," <ext_id>}
<ext_id>::= <id> ["(" ("*" | <attrib_list>) ")"]
<attrib_list>::= <name> {"," <name>}

As an example statement that can be generated by this syntax, the following statement:

let screen1, class Log observe line1(length), class Point (*);

which sets up an object screen1 and a class Log as observers for changes in length attribute of object line1, and any change in state of any object of class Point. Such statements that can be generated by this syntax can be annotated as 'let—observe—exec' statements.

To show the implementation of the observer construct and how it can be applied, three Java classes are defined and several instances of them in Table I: Line and Point as subjects while Screen as an observer. In the Application class, some instances of these classes are created to utilize them in the instance-level application of the construct. Some scenarios of the observer pattern require all instances of a class to observe subjects (i.e., class-level observing), while some others need every instance to have its own observing logic (i.e., instance-level observing). The observer construct provides both class- and instance-level observing. The general structure of the observer construct is as follows: observers (classes and instances) are placed after the let keyword, subjects (classes and instances) after the observe keyword, and, optionally, the notification method after the exec keyword.

TABLE I

Four Java Classes: Two Subjects, An Observer, And An Application

| First Subject Class | Second Subject Class |
| --- | --- |
| class Line {<br>  Color color;<br>  int length;<br>  void setLength(int<br>    len) { this.length =<br>    len; }<br>  void setColor(Color<br>    c) { this.color = c; | class Point {<br>  int x, y;<br>  void setPos(int x, int<br>    y) { this.x = x;<br>    this.y = y; }<br>} |

TABLE I-continued

Four Java Classes: Two Subjects, An Observer, And An Application

Observer Class class Screen {
  public void resize(int len) {
    System.out.println("Resizing
      with the new length: " + len); }
  public void display(String str){
    System.out.println(str); }
}

Application

Line line = new Line( );
Point point = new Point( );
Screen screen1, screen2, screen3 = new Screen( );

In general, the construct can directly support the application of all the scenarios of the observer pattern as shown in FIG. 6A (with both: class-level and instance-level observing). In its current implementation, however, scenarios involving mixed usage of instance- and class-level observing can be specified by multiple separate 'let—observe—exec' statements, rather than a single statement.

The class-level observing can be applied as follows:
let class Screen observe class Line, class Point;

In this kind of observing, programmers can indicate that one class is observing a subject class or a set of subject classes. Consequently, all instances of the observing class will be notified when any instance of the subject(s) has state changes. This application shows a case of the class-level version of Multiple Subjects—Multiple Observers scenario that is applied using only one statement.

The observing logic in the instance-level version of the observer pattern is accomplished instance-wise. This means that each constructed object of the observing class may observe various subjects with a different number of attributes of each subject. One form of this kind of observing is to observe a single attribute of a single subject, as follows:
let screen1 observe line(length) exec resize(length);

This case refers to the Single Subject—Single Observer scenario in which the programmer has to specify the observing instance, the subject and the notification method that will receive the change of the state of the specified attribute of the subject and send it directly to the corresponding observer. Another form is to observe multiple attributes of single subject by one observing instance. This form represents the Multiple Subjects—Single Observer scenario with the case of observing many attributes of a subject using one statement, as shown in the following application:
let screen2 observe line(color,length) exec display;

The restriction of this application is that the programmer has to define only one notification method (with a String-type parameter) to refresh the observing instance with the state changes of all attributes of the subject. If the programmer did not specify the notification method, the compiler is built to assume that there exist a method called 'display' in the observing class will do the job.

Last form is to observe multiple subjects with all their attributes using one statement as shown below. This form also represents the Multiple Subjects—Single Observer scenario but now with the case of having many subjects with either single or multiple attributes per each. This could be accomplished by either not specifying the attributes at all, or by using the wildcard (*) to refer to all attributes. With respect to specifying the notification method, cases of the previous form also apply here.

let screen3 observe line, point(*);

After parsing 'let—observe—exec' statements and matching them with the given syntax of the construct, the compiler then moves into other compilation passes that are concerned with the construct semantics. During these passes (with the help of the type system), the compiler starts recognizing class types, instances, attributes and methods used in the construct application by carrying out scoping and type-checking operations. If such checking is passed successfully, the compiler then carries out the code conversion (or rewriting). Otherwise, a semantic exception is generated by the compiler.

The compiler checks the validity of each element of the observer construct (i.e., classes, instances, attributes and the notification method) to see whether they are not defined or out-of-scope. The compiler in such cases will generate a semantic exception. Another check is conducted when the construct is applied without specifying a notification method. In this case, a programmer has to define a notification method named display in the observing class to be responsible for refreshing it with the changes happened. If such a method is not defined, the compiler will also produce a semantic exception.

In the type checking process, the compiler is going to pick the class included in the observer construct, and checks its eligibility. For instance, when the programmer uses an observer construct for primitive types, the compiler will check and produce an appropriate alert message showing that only classes or instances can be applied. Also, when programmer use the instance-level observing form, then the argument type of the notification method must match the type of the observed attribute. For the case of applying the construct with a default notification method, the compiler would expect programmers to define a method called display in observing class that accepts the changes as a String type.

Figure 6B:
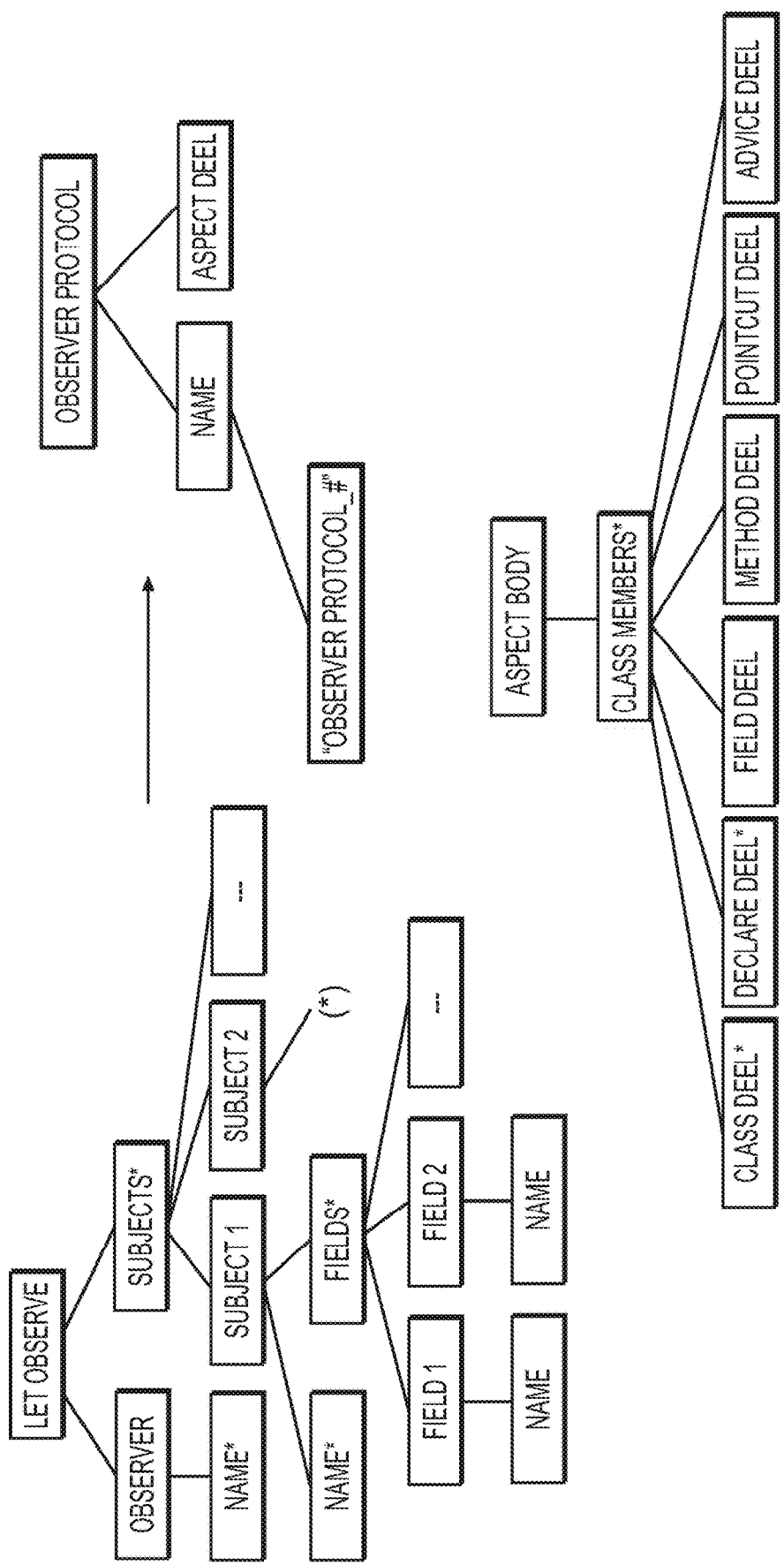
FIG. 6B is a diagram of an example conversion of a LetObserve node into an AspectDecl node in accordance with some implementations.

After achieving all checks successfully, the compiler starts converting LetObserve nodes into their corresponding aspect declaration nodes that the original AspectJ compiler can deal with. This node translation is actually executed through a code conversion pass of the compiler where each 'let—observe—exec' statement is converted into a specialized aspect, as shown in FIG. 6B, that contains the proper crosscutting concerns of the observing statement as shown in Tables IIA and IIB.

TABLE IIA

A. Class-level Observing

```
1  protected privileged aspect ObserverProtocol_1
2  {
3     private List observers = new ArrayList( );
4     //----------------------------------------
5     protected pointcut newInstance(Screen obs):
6       execution(Screen.new(..)) && target(obs);
7     after(Screen obs): newInstance(obs) {
8       observers.add(obs);
9     }
10    //----------------------------------------
11    protected pointcut subjectChange( ) : set(* Line.*) ||
12      set(* Point.*) ;
13    after( ): subjectChange( ) {
14      Iterator it = observers.iterator( ); while
15      (it.hasNext( )){
16        Screen obs = (Screen)it.next( ); obs.display(
17          thisJoinPoint.getSignature( ) +
18            " changed..");
19      }
20    }
21  }
22
```

TABLE IIA-continued

A. Class-level Observing

```
23
24
25
```

TABLE IIB

B. Instance-level Observing

```
1  protected privileged aspect ObserverProtocol_2
2  {
3     private Screen obs;
4     public void addObserver(Screen obs) { this.obs = obs;
5     }
6     //----------------------------------------
7     public interface Subject { }
8     declare parents:     Line implementsSubject; protected pointcut
9       subjectChange(Subject s) :
10    (
11      set(* Line.length)
12    ) && target(s);
13    after(Subject s): subjectChange(s) { obs.resize(((Line)
14      s).length);
15    }
16 }
17
18
19
20
21
```

Every auto-generated aspect is assigned a name of the form 'ObserverProtocol #', where the hash symbol refers to a sequence number that will be assigned for each auto-generated observing aspect. The newly generated node (i.e., the aspect declaration) is created outside the class that contains the application of the observer construct. Indeed, aspects generated for class-level observing purposes have a different implementation style from the ones used for instance-level.

Class-Level Observing: As shown in Table II-A, an aspect is generated for the 'let—observe—exec' statement (1). This aspect implements the observing logic for all instances of the supplied observer class in the statement. Therefore, a list of observers (Line 3) is employed to hold a reference copy for every newly created object of that observer class. Object construction joinpoints are crosscutted using the pointcut declared in Lines 5-6 and are advised in Lines 8-10. Whenever a subject has changes on its associated attributes, the subjectChange pointcut (declared in Lines 12-14) will be executed. Consequently, every instance of that observing class will be notified (this task is accomplished by the advice declared in Lines 16-24). After a successful generation of the desired aspects, the compiler replaces 'let—observe—exec' statements by empty statements (i.e., semicolons ';').

Instance-Level Observing: In instance-level observing, an aspect is also generated for the 'let—observe—exec' statement (2) as shown in Table II-B. This aspect has only one observer field (Line 3) that holds a reference copy of the observing instance that will be assigned via the addObserver method, which will be invoked at the client application (In particular, at the line(s) where the 'let—observe—exec' statement is written in the source code). Once the subject has changes in its attributes, the subjectChange pointcut declared in Lines 13-16 is executed. As a result, the observing instance is notified (the advice declared in Lines 18-20 will do this task) using the notification method that was already associated with the statement of the observer construct. In addition, this aspect has a public Subject interface (Line 9) that will be implemented by all observed (Subject) classes. This interface can then used in place of subject classes to capture changes of any subject implementing it. After generating this aspect successfully, the 'let—observe—exec' statement is replaced by a method-call statement, as follows:

ObserverProtocol_2.aspectOf( ).addObserver(screen1);

Decorator Design Pattern Example

The decorator pattern is a pattern that performs additional actions on certain objects. It has several advantages over subclassing (i.e. inheritance) as the extra actions and objects can be added or removed per object at runtime. Also, adding more than one decoration action is easier than subclassing, which may cause a subclasses explosion. In addition, the order of the decorations can be important when one decorator is needed to be implemented before another, and resolving this issue using subclassing is somewhat difficult. The decorator pattern allows such priority to be defined easily.

Like the observer pattern, in the disclosed extension, provided is a more abstract and modular construct that allows applying the decorator pattern with fewer code than AspectJ, using the following EBNF notation:

<DecorateWith>::= "decorate" <class_id> "." <method_declaration> "with" <block> [ "to" <object_ids_list> ";" ]

Using this syntax, a programmer can either decorate all objects of a certain class (class-level decorating) or specific instances of the class (instance-level decorating). In both cases, the decorator pattern decorates a specific method of the class (i.e., to decorate N methods, N of DecorateWith statements should be applied).

By following the decorator construct syntax, the programmer can apply it as shown in Listing 1. In this example, the decorator construct, DecorateWith, is applied to two different display methods of the Screen class. The first one accepts a single String parameter, while the other accepts two String parameters.

Listing 1

```
1   // Class-level Dollar Decorator
2   decorate Screen.display(String s) with {
3       s = "$$$" + s +"$$$";
4   }
5   // invoke the decorated method
6   screen1.display("111"); // the decorated version
7   screen2.display("222"); // the decorated version
8   screen3.display("333"); // the decorated version
9   //---------------------------------------------
10  // Instance-level Star Decorator
11  decorate Screen.display(String fn, String ln) with {
12      fn = " *** " + fn;
13      ln = ln +" *** ";
14  } to screen1, screen2;
15  // Instance-level Bracket Decorator
16  decorate Screen.display(String fn, String ln) with {
17      fn = " [[[ " + fn;
18      ln = ln +" ]]] ";
19      } to screen1;
20
21  // invoke the decorated method
22  screen1.display("aaa", "bbb"}; // both [ ] and * decorators
23  screen2.display("ccc", "ddd"} // only * decorator
24  screen3.display("eee", "fff"}; // un-decorated version
```

Applying the class-level decorating is shown in Lines 2-4 of Listing 1 by decorating the method display in the Screen class with a dollar decoration. Doing so, the programmer can decorate one method of one class in an expressive way. Firstly, the class should be specified, then the target method separated by a dot delimiter. In this case, all instances of this class will be decorated, which also reduces the implementation overhead. Whenever the display(String) method is invoked by any object of the Screen class (as shown in lines 6 and 8), the associated decoration will be applied. Hence, instead of printing the strings '111', '222' and '333', the program will print the decorated versions of these strings, which appear like $$$111$$$, $$$222$$$ and $$$333$$$, respectively.

Instance-level decorating has a similar structure to the class-level decorating. The difference is that objects intended to be decorated should be specified in the construct. The first demonstration of the Instance-level decorating is given in Lines 11-14 of Listing 1 by applying a star decorator to the String parameter of the display method, and the target objects are: screen1 and screen2. The second one (Lines 16-19) is similar, but with a bracket decoration and only applies for the object: screen1. Decorating per instance does not exist in the original AspectJ implementation of the decorator pattern introduced by Hannemann and Kiczales. This limitation is resolved in the disclosed technique and extension, as this feature is provided by storing reference copies of the decorated objects in the auto-generated aspect. Invoking the display method with two String parameters is expressed in Lines 22-24 of Listing 1. The display method in screen1 is decorated with both the star and the bracket decorators; so, it will print the double decorated version of the strings (i.e. '[[[* aaa bbb *]]]'). The application order (precedence) of the decorators is discussed later.

The next process after identifying the syntax is specifying its meaning (i.e. semantics). The semantics passes come after the syntax parsing pass of the compiler. The compiler in these passes is going to do variable scoping, type checking, and followed by rewriting. The latter will be reached if the former are semantically approved successfully.

The compiler checks where the decorated class (or object) is already defined, and the method intended to be decorated exists in that class and also have the same number (or type) of arguments as specified in the construct. In addition, the body of the decorator construct should only access the local variables declared inside it, global variables are not allowed to be used. Furthermore, an empty body implies an empty decoration.

In the type checking process, the compiler picks up the types included in the decorator construct, and checks their eligibility. The first thing that should be conformed is that the decorator construct is applied to class types. Then, conforming that the type of instances specified in the decorator construct matches the class type of the decorated method.

Figure 6C:
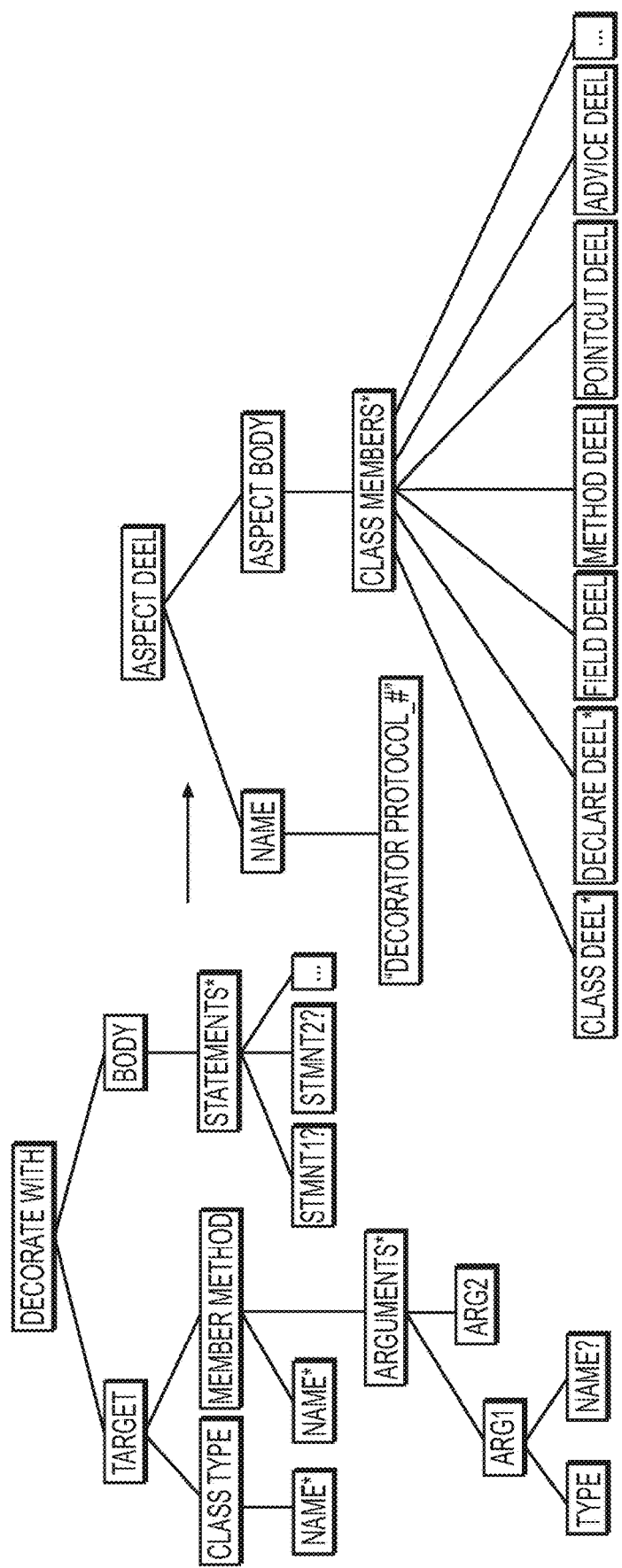
FIG. 6C is a diagram of an example conversion of a DecorateWith node into an AspectDecl node.

The compiler is now ready to convert the DecorateWith node into a corresponding Java-AspectJ node, as shown in FIG. 6C, based on the information provided. An aspect declaration node named DecoratorProtocol will be generated to involve the concrete decorating process. Similar to the observer pattern, every decorate-with-to statement inside the source code will be converted into a specialized aspect that contains the cross-cutting concerns of the Java program as shown in Table III. All decorator aspects will have the name 'DecoratorProtocol_#', where the hash symbol represents a sequence number assigned per each decorator construct.

TABLE IIIA

Auto-Generated Aspect for Decorator Pattern - Class-level

A Class-level Decorating

```
1  protected privileged aspect DecoratorProtocol 1
2  {
3      protected pointcut decoratedMethod
4          (String s):
5              call(* (Screen) .display(String)) &&
6                  args(s);
7
8      void around (String s):
9          decoratedMethod(s) {
10             s = " $$$ " + s + " $$$ *;
11             this.proceed(s);
12         }
13 }
```

As shown in Table III (A), one aspect will be generated for each class-level decorator construct. This aspect declares a general pointcut (Lines 3-6) that captures the method-call joinpoints by any object of the class specified in the construct. When the method call happens, the around advice (Lines 8-12) will decorate the corresponding arguments of the method, and then proceed to the method call instantly. After that, the DecorateWith nodes will be replaced by empty statements (i.e. semicolons ';').

TABLE IIIB

Auto-Generated Aspect for Decorator Pattern - Instance Level

B. Instance-level Decorating

```
1  protected privileged aspect DecoratorProtocol 2
2  {
3      private List decs = new ArrayList( );
4      public void addDecorator(Screen dec) {
5          decs.add(dec);
6      }
7      protected pointcut decoratedMethod
8          (String s, Screen dec):
9              call(* Screen.display(String)) &&
10                 args(s) &&
11                 target(dec);
12     void around(String s, Screen dec);
13         decoratedMethod(s, dec) {
14         if(decs.contains(dec)) {
15             s = " *** " + s + "*** ";
16         }
17         this.proceed(s, dec);
18     }
19 }
20
21
```

As shown in Table III (B), one aspect will be generated for each instance-level decorator construct. This aspect maintains a list (Line 3) that holds reference copies of the instances associated with the pattern construct. The decoration registration is achieved by the addDecorator method (Lines 5-7) which will be invoked at the client application. Whenever the decorated method is invoked by an object of the decoration class, the decoratedMethod pointcut (Lines 8-12) is fired and, consequently, the around advice will check the existence of the calling object in the list, Lines 14-20. If the target object is considered for decoration, then the corresponding arguments of its method will be decorated (Lines 16-18), and then proceed to the method call instantly (Line 19). Otherwise, the original (un-decorated) method will be proceeded to. The DecorateWith nodes will be replaced by method-call statements for each decorated instance, as follows:

```
DecoratorProtocol_2.aspectOf( ).addDecorator(screen1);
DecoratorProtocol_2.aspectOf( ).addDecorator(screen2);
```

It is required in the decoration process to determine the precedence of the decorators. This means that the decorators should be applied in a certain order. The precedence depends on the declaration order of the decorators and so that the decorator that is declared first in the source code has the highest precedence and, thus, will be applied first.

An issue of implementation overhead is faced by the traditional implementation of design patterns (e.g., using OO or AO facilities) as the programmer will focus on implementing design patterns correctly in addition to his functional code. This issue is resolved in the disclosed compiler technique as the programmer can save time and space by applying the pattern immediately without the need for building the concrete implementation. Instead, in the disclosed approach, the concrete implementation of the pattern is automatically generated by the extended compiler and is applied as the programmer needs.

The use of language extensions, as described herein, can lead to shorter implementations than previously proposed implementations respect to lines of code. For example, for the application of the Observer pattern example presented in section 4, the effective number of lines of code is 1 for both class-level and instance-level versus 16 for class-level and 18 for instance-level in AspectJ. Similarly, for the Decorator pattern example in Listing 1, the effective number of lines of code is 3 for both class-level and instance-level 10 for class-level observing and 18 for instance-level observing in AspectJ. For the case declaring a class, the construct has only 1 line of code compared with 5 using the conventional approach, while 1 line of code is needed for instantiation of n instance copies compared n lines of code using the conventional approach.

Modularity in the disclosed approach is provided by separating the implementation of design patterns from the implementation of the actual logic of the application. In addition, the actual implementation of such patterns is not visible to the programmer and it is isolated from one application to others. This allows programmers (at different clients) maintain, modify and alter their applications of design patterns in a modular and easy way.

The disclosed technique can be implemented as an AspectJ extension which summarizes code in few-keyword constructs, similar to a meta-programming language. Additionally, the disclosed compiler can auto-generate aspects according to the information provided as parameters by the proposed constructs, adapted from the parametric aspects. Although the example described is an AspectJ based extension, it can provide the instance-level advising feature which is inspired from classpect model introduced in Eos (see Rajan H, Sullivan K. Classpects in practice: A test of the unified aspect model. Technical Report, Citeseer 2005, incorporated herein by reference).

The syntax of design patterns in the disclosed compiler-based technique is clear, concise and expressive in a way that it does not require importing packages, building classes (or aspects), or dealing with something missing in the design principle of design patterns. A programmer simply needs to learn the syntax of the pattern constructs and how they are applied. Furthermore, the readability and writeability is highly improved as the written code becomes shorter and more self-explanatory. So, the absence of dependencies makes it very easy to revise the code during maintenance.

Hannemann and Kiczales used AO constructs to improve the implementations of the original 23 design patterns using AspectJ. (see, Hannemann J, Kiczales G. Design pattern implementation in Java and AspectJ. ACM Sigplan Notices, vol. 37, ACM, 2002; 161-173, incorporated herein by reference). They provided an analysis and evaluation of the improvement achieved to the implementation of the patterns according to different metrics, which also have been addressed later by Rajan using Eos extended with the classpect construct that unifies class and aspect in one module. (see, Rajan H. Design pattern implementations in Eos. Proceedings of the 14th Conference on Pattern Languages of Programs, A C M, 2007; 9:1-9:11, incorporated herein by reference). When compared with Hannemann's implementation in terms of lines of code and the intent of the design patterns, Rajan observed that Eos could efficiently outperform AspectJ in implementing 7 of the design patterns, while being similar for the other 16 patterns. In addition, the instance-level advising feature supported by Eos classpects was another advantage over AspectJ. This feature allows a direct representation of runtime instances without the need to imitate their behavior. Another work was also done by Sousa and Monteiro with Caesar) that supports family polymorphism. (see, Sousa E, Monteiro M P. Implementing design patterns in CaesarJ: an exploratory study. Proceedings of the 2008 AOSD workshop on Software engineering properties of languages and aspect technologies, ACM, 2008; 6:1-6:6, incorporated herein by reference). Their approach employs a collaboration interface that can hold a set of inner abstract classes, and some second level classes: the implementation and binding parts. Also, their results demonstrated positive influence of the collaboration interface on modularity, generality, and reusability over those with AspectJ. Gomes and Monteiro introduced the implementation of 5 design patterns in Object Teams compared with that in Java and AspectJ. (see, Gomes J L, Monteiro M P. Design pattern implementation in Object Teams. Proceedings of the 2010 ACM Symposium on Applied Computing, A C M, 2010; 2119-2120; and Monteiro M P, Gomes J. Implementing design patterns in Object Teams. Software: Practice and Experience 2013; 43(12): 1519-1551, both of which are incorporated herein by reference). Regardless of Object Teams goals, it showed support for implementing design patterns efficiently, and with more than one alternative. The entire conversion of aspects into teams was described in detail in their work. The common issue with all these different approaches is that they suffer from the implementation overhead and traceability problems in concrete implementation of design patterns, as the concrete implementation is required to be manually written by programmers, which may reduce their productivity.

Another approach was introduced by Zook et al. (see, Zook D, Huang S S, Smaragdakis Y. Generating AspectJ programs with meta-AspectJ. Generative Programming and Component Engineering, Springer, 2004; 1-18, incorporated herein by reference). This approach uses code templates for generating programs as their concrete implementation, called Meta-AspectJ (MAJ). Development time is reduced in this approach since it enables expressing solutions with fewer lines of code. With respect to design patterns, MAJ provides some general purpose constructs that reduce writing unnecessary code. However, programmers cannot explicitly declare the use of design patterns at certain points of the program, which may also lead to a traceability problem.

Another trend was introduced by Bosch, who provided a new object model called LayOM. (see, Bosch J. Design patterns as language constructs. Journal of Object-Oriented Programming 1998; 11(2):18-32, incorporated herein by reference). This model supports representing design patterns in an explicit way in C++ with the use of layers. It provides several language constructs that represent the semantics of 8 design patterns and can be extended with other design patterns. Although LayOM could resolve the traceability problem and enhance modularity, it lacks expressiveness as it has a complicated syntax consisting of message forwarding processes that might confuse programmers. The disclosed technique provides a similar power to LayOM, but, in contrast, the observer construct in the disclosed technique has a more concise, expressive, easy-to-use and easy-to-understand syntax.

Hedin also introduced a new technique that is slightly similar to LayOM but using rules and pattern roles. (see, Hedin G. Language support for design patterns using attribute extension. Object-Oriented Technologys. Springer, 1998; 137-140, incorporated herein by reference). The rules and roles can be defined as a class inheritance and specified by attribute declarations. The Hedin technique permits the extended compiler to automatically check the application of patterns against the specified rules. However, the creation of rules, roles, and attributes has a complex syntax that lacks expressiveness and may require an extensive effort to learn and build them.

Another extensible Java compiler is PEC, which was proposed by Lovatt et al. (see, Lovatt H C, Sloane A M, Verity D R. A pattern enforcing compiler (PEC) for Java: using the compiler. Proceedings of the 2nd Asia-Pacific conference on Conceptual modelling-Volume 43, Australian Computer Society, Inc., 2005; 69-78, incorporated herein by reference). Design patterns in PEC were provided as marker interfaces. A class must implement the proper ready-made interface in order to conform to a certain design pattern. After that, the PEC compiler will have the ability to check whether the programmer follows the structure and behavior of that pattern or not. However, the PEC compiler does not reduce the effort needed to implement design patterns (i.e., it suffers from implementation overhead). Instead, it allows programmers to assign the desired design pattern to a given class and then implement that pattern manually. Eventually, the compiler will just check the eligibility of that implementation.

Budinsky et al. introduced a tool that automates design pattern implementation. (see, Budinsky F J, Finnie M A, Vlissides J M, Yu P S. Automatic code generation from design patterns. IBM Systems Journal 1996; 35(2):151-171, incorporated herein by reference). Each design pattern has a certain amount of information like name, structure, sample code, when to use, etc. The programmer can supply information about the desired pattern, then the implementation (in C++) will be generated automatically. This approach allows programmers to customize design patterns as needed, but the modularity and reusability is missed, and it suffers from the traceability problem as well.

The disclosed compiler approach for implementing and applying design patterns in programming languages facilitates the implementation of design patterns in an expressive and intuitive manner. The example described is a language extension (Java-AspectJ extension using abc) that provides new constructs with concise application of the singleton, observer, and decorator design patterns. The resulting compiler generates the entire concrete implementation of design patterns automatically. As a result, this compiler extension enables the Java and AspectJ compilers to recognize the explicit application of any scenario of design patterns, and implement the proper action accordingly. In addition, the disclosed approach provides features address some previously identified issues in the literature.

Supporting different levels of applications of the constructs helps programmers decide where and how to apply constructs. The class-level application is beneficial if all objects of a certain class are required to have the observing/decorating facilities, whereas instance-level application is useful when not all objects need the class properties, or when each object needs to have its own functionality.

Some implementations of the disclosed compiler approach permit design patterns to be applied and used using simple, intuitive, and easy-to-use constructs as a language extension. This approach is applicable to all kinds of design patterns, including creational, structural, or behavioral, to facilitate their application and usage by programmers. (see, Vlissides J, Helm R, Johnson R, Gamma E. Design patterns: Elements of reusable object-oriented software. Reading: Addison-Wesley 1995; 49:120, incorporated herein by reference). The disclosed compiler based approach includes a process of translation and a compiler extension approach that includes performing process stages that are applicable to other design patterns beyond the examples discussed herein.

The disclosed compiler based technique is applicable, at least, to the three categories of the 23 most commonly used design patterns (Creational: Singleton, Prototype, Builder, Factory Method, or Abstract Factory; Structural: Decorator, Adapter, Bridge, Composite, Facade, Flyweight, or Proxy; and Behavioral: Observer, Visitor, Mediator, Iterator, Interpreter, Command, Chain of Responsibility, State, Strategy, Template Method, or Memento). As described herein an example implementation was applied to one pattern of each category: Singleton from the creational category, Decorator from the structural category, and Observer (the already published one) from the behavioral category, for illustration purposes. The disclosed compiler-extension technique could support all three categories of design patterns by providing an appropriate syntax for each design pattern in these categories. To support a certain design pattern using the disclosed technique, one would define appropriate syntax (with the desired keywords) representing how programs should use that pattern in an expressive manner, and then follow the process model described in the present disclosure to add it as an extension to an either object-oriented-based (e.g., Polyglot) or aspect-oriented-based compiler (e.g., abc).

The disclosed technique is applicable as a compiler extension, which facilitates embedding the design pattern constructs within any programming language without requiring users to download additional libraries. Known conventional approaches are not implemented as compiler extensions. In contrast, known conventional approaches are either implemented as separate compilers, tools, or libraries that may be difficult for programmers to link into production code.

The disclosed technique removes a need for programmers to be aware of how the design patterns are implemented. Using the disclosed technique, a programmer need only know the syntax and apply the pattern of choice, which permits the programmer to focus more on production code rather than implementing the code for design patterns and linking the different classes and interfaces associated with the design pattern. This also makes the process less error-prone and easier to optimize the implementation in the back-end of the compiler. In some conventional approaches, programmers may need to have knowledge about the different classes, interfaces, or aspects before applying a design pattern. In addition, the programmers may need to customize the concrete implementation of the design pattern to fit a given application.

The disclosed technique could be adapted to any object-oriented programming language provided the language includes an extensible compiler for the language. In addition, in the disclosed technique, the concrete implementation (i.e., translated code) of the design patterns constructs could be object-oriented or aspect-oriented. This does not affect the simplicity and expressiveness of the approach as the front-end constructs will be the same. Some conventional approaches for a given language may not provide applicability to other languages.

The disclosed technique is flexible in that the technique permits developers (e.g., who may need to support new design patterns in the extensible compiler) to choose whatever keywords and syntax they prefer to make the implementation of their desired patterns as easy-to-use as possible for the end programmers. Furthermore, the application of design patterns in the disclosed technique could be done using single statements with various options allowing different scenarios to be implemented. In some conventional approaches that allow having design pattern as language constructs, the syntax may be significantly more complicated and not easy to follow, as the syntax may have been designed using a set of layer types and they are fixed and need to be applied as they were designed. In the disclosed technique, developers can supply their own syntax of a design pattern and define as many scenarios as desired of its application. Programmers, on the other hand, can have flexible constructs to apply a design pattern, with the ability of passing desired options as parameters.

The disclosed technique is not designed to detect or identify design patterns as some of the conventional approaches do. Instead, the disclosed technique supports the implementation and application of design patterns in a concise, intuitive, and expressive manner. Therefore, implementations of the disclosed technique can assist with detection techniques by permitting a user or system to search for specific construction of a design pattern rather than looking for patterns to infer their existence in the source code.

Design patterns using the disclosed technique could be applied in a clear, concise, and expressive manner, without the need to import additional packages, create classes (or aspects), or missing the design principle of design patterns. With the disclosed technique, a programmer simply implements a design pattern by constructing an appropriate syntax for the design pattern and defining how it is going to be applied and executed (i.e., semantics). As well, the readability and writeability may be significantly improved as the written code becomes shorter and more self-explanatory. Hence, the absence of dependencies makes it easier to revise the code for the sake of maintenance. Moreover, it can strongly ease the detection of design patterns in source code, since detection techniques will have to search for specific keywords to identify where a certain pattern is applied/used. In summary, the readability, writeability, modularity of design patterns are all enhanced using the disclosed technique.

Another advantage of the disclosed technique is that it may help programmers decide where and to what level design pattern constructs are applied. The class-level application is beneficial if all objects of a certain class are required to apply the design pattern, whereas instance-level application is useful when not all objects need the class properties, or when each object needs to have its own functionality.

With almost all conventional approaches for implementing design patterns, programmers need to be aware how to implement design patterns. In other words, programmers participate in the process of linking classes and methods with each other and to define certain interfaces and helper methods to achieve the purpose of the implemented design patterns. However, in the present approach, programmers simply use design pattern constructs to link between the different program components in an intuitive way. In contrast, "design pattern constructs" (i.e., LayOM; see J. Bosch. "Design Patterns as Language Constructs." Journal of object-oriented programming". 1998; 11(2)) are complicated and require programmers to be aware of other language components, such as states, categories and layers while implementing design patterns. Such conventional approaches are based on C++ compilers and do not disclose improvements related to design pattern implementation or program performance.

Design patterns may be error-prone if the underlying code is written by users. In addition, when users implement such design patterns, performance issues are of lesser importance and trend towards lower productivity as they deviate from presentation of functional code to the design pattern code. The present approach allows programmers to focus on writing functional code while using only a single expressive constructs for implementing a certain design pattern.

Having much design code written by programmers requires more disk space, as programmers may need to clone and scatter design pattern code in different classes and methods of a program (i.e., thereby lacking modularity). This by itself requires more maintenance. Even if it was possible to increase the level of modularity in implementing design patterns, the present design pattern constructs are of higher levels of modularity since they represent recognizable units of the program. Reuse in different parts of the code is independent and they do not affect one another. The present design pattern constructs also require less disk space, since they are transformed into concrete design pattern code at the compile time.

Design pattern detection is known to be a challenging problem in the literature (see D. Heuzeroth, T. Holl, G. Hogstrom, W. Lowe. "Automatic design pattern detection." In 11th IEEE International Workshop Program Comprehension, 2003 (pp. 94-103)) since tools need to identify features or semantics of design patterns in the source code and may use machine learning and approximation methods to help in deciding whether a design patterns implementation exists in a certain class or method. However, the present approach makes it easy for design pattern detection tools since they would only need to search for our specific recognizable constructs and produce highly accurate identification results.

As a Java compiler extension, the present approach is portable and can be compatible with all environments that support the Java language runtime, which works in almost all operating systems. In addition, the present approach is extensible by itself, which means developers and researchers can add desired design patterns to the compiler extension using the methodology presented in the disclosure.

The cost of implementing a compiler extension in abc (e.g., with Polyglot (see N. Nystrom, M. R. Clarkson, A. C. Myers. "Polyglot: An extensible compiler framework for Java". In International Conference on Compiler Construction, 2003 (pp. 138-152).) as a frontend) is known to be of minimal overhead since the code required to implement an extension to the Java compiler is fairly simple and modular (see P. Avgustinov, A. S. Christensen, L. Hendren, S. Kuzins, J. Lhoták, O. Lhoták, O. De Moor, D. Sereni, G. Sittampalam, J. Tibble. "abc: An extensible AspectJ compiler." In Transactions on aspect-oriented software development I, 2006 (pp. 293-334)). Transforming the code of the present design pattern constructs is also efficient since abc employs a sophisticated program analysis and a variety of optimization methods to ensure correctness and efficiency of code transformation using the Soot backend (see R. Vallée-Rai, E. Gagnon, L. Hendren, P. Lam, P. Pominville, V. Sundaresan. "Optimizing Java bytecode using the Soot framework: Is it feasible?". In International conference on compiler construction, 2000 (pp. 18-34)). Soot's program analysis allows removing unnecessary checks and initialisations from the program before generating the Java bytecode, which enhances the program's performance at runtime. Therefore, the present design pattern constructs can improve the performance of computer programs, especially when compared to conventional approaches.

Figure 7:
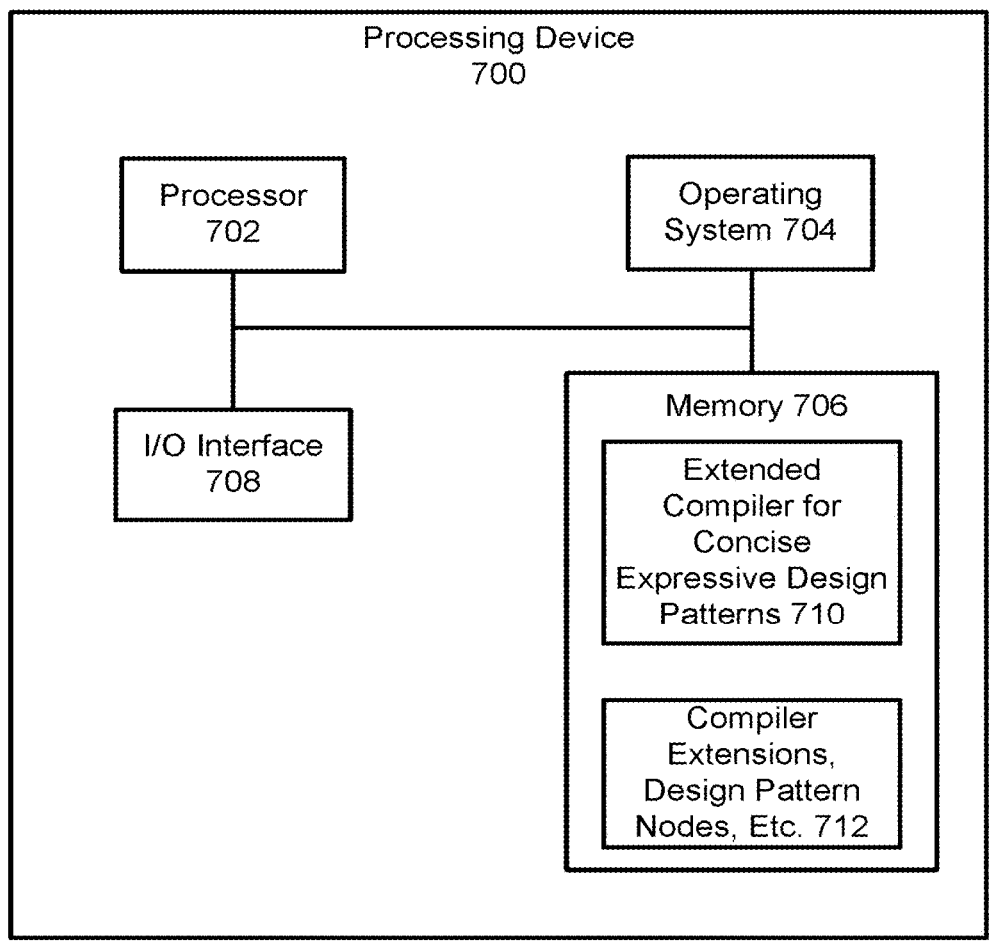
FIG. 7 is a diagram of an example processing device configured for compiling concise expressive design pattern source code in accordance with some implementations.

FIG. 7 is a block diagram of an example processing device 700 which may be used to implement one or more features described herein. In one example, device 700 may be used to implement a computer device including a compiler (e.g., 104), and perform appropriate method implementations described herein (e.g., one or more of 202-220). Device 700 can be any suitable computer system, server, or other electronic or hardware device. For example, the device 700 can be a mainframe computer, desktop computer, workstation, portable computer, or electronic device (portable device, mobile device, cell phone, smart phone, tablet computer, television, TV set top box, personal digital assistant (PDA), media player, game device, wearable device, etc.). In some implementations, device 700 includes a processor 702, an operating system 704, a memory 706, and input/output (I/O) interface 708.

Processor 702 can be one or more processors and/or processing circuits to execute program code and control basic operations of the device 700. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 706 is typically provided in device 700 for access by the processor 702, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 702 and/or integrated therewith. Memory 706 can store software operating on the device 700 by the processor 702, including an operating system 704, one or more applications 710, and messaging/chat session data 712. In some implementations, applications 710 can include instructions that enable processor 702 to perform the functions described herein, e.g., some or all of the method of FIG. 2.

For example, applications 710 can include an extended compiler having extensions for compiling concise expressive design pattern source code elements as described herein. Any of software in memory 704 can alternatively be stored on any other suitable storage location or computer-readable medium. In addition, memory 704 (and/or other connected storage device(s)) can store compiler extensions, node factory information, and other instructions and data used in the features described herein. Memory 704 and any other type of storage (magnetic disk, optical disk, magnetic tape, or other tangible media) can be considered "storage" or "storage devices."

I/O interface 708 can provide functions to enable interfacing the processing device 700 with other systems and devices. For example, network communication devices, storage devices (e.g., memory and/or database), and input/output devices can communicate via interface 708. In some implementations, the I/O interface 708 can connect to interface devices including input devices (keyboard, pointing device, touchscreen, microphone, camera, scanner, etc.) and/or output devices (display device, speaker devices, printer, motor, etc.).

For ease of illustration, FIG. 7 shows one block for each of processor 702, memory 706, I/O interface 708, and software block 710. These blocks may represent one or more processors or processing circuitries, operating systems, memories, I/O interfaces, applications, and/or software modules. In other implementations, device 700 may not have all of the components shown and/or may have other elements including other types of elements instead of, or in addition to, those shown herein.

In general, a computer that performs the processes described herein (e.g., the method of FIG. 2) can include one or more processors and a memory (e.g., a non-transitory computer readable medium). The process data and instructions may be stored in the memory. These processes and instructions may also be stored on a storage medium such as a hard drive (HDD) or portable storage medium or may be stored remotely. Note that each of the functions of the described embodiments may be implemented by one or more processors or processing circuits. A processing circuit can include a programmed processor, as a processor includes circuitry. A processing circuit/circuitry may also include devices such as an application specific integrated circuit (ASIC) and conventional circuit components arranged to perform the recited functions. The processing circuitry can be referred to interchangeably as circuitry throughout the disclosure. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device.

The processor may contain one or more processors and even may be implemented using one or more heterogeneous processor systems. According to certain implementations, the instruction set architecture of the processor can use a reduced instruction set architecture, a complex instruction set architecture, a vector processor architecture, a very large instruction word architecture. Furthermore, the processor can be based on the Von Neumann model or the Harvard model. The processor can be a digital signal processor, an FPGA, an ASIC, a PLA, a PLD, or a CPLD. Further, the processor can be an x86 processor by Intel or by AMD; an ARM processor, a Power architecture processor by, e.g., IBM; a SPARC architecture processor by Sun Microsystems or by Oracle; or other known CPU architecture.

The functions and features described herein may also be executed by various distributed components of a system. For example, one or more processors may execute the functions, wherein the processors are distributed across multiple components communicating in a network. The distributed components may include one or more client and server machines, which may share processing in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed. A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable circuits configured to execute program code and/or computer instructions to execute the functions, processes and algorithms described herein. Additionally, an implementation may be performed on modules or hardware not identical to those described. Accordingly, other implementations are within the scope that may be claimed.

What is claimed is:

1. A method for compiling concise expressive design source code, comprising:
   obtaining a design pattern lexer supplement;
   extending a lexer of a compiler using the design pattern lexer supplement;
   extending grammar rules of the compiler to include one or more design pattern grammar extensions, wherein extending the grammar rules includes extending a class declaration rule to specify which design patterns apply to which classes at application time, wherein the extended class declaration rule includes adding a design pattern modifier in a class declaration that indicates to the compiler that a class corresponding to the class declaration is applying design pattern, and extending a statement without trailing substatements rule to permit creation of a new instance of the design pattern;
   extending a parser to include one or more design pattern extensions;
   providing the compiler with a node factory including one or more design pattern nodes;
   parsing source code containing one or more explicit design pattern source code tokens using the parser and the lexer;
   verifying syntax of the source code containing one or more explicit design pattern source code tokens using the parser;
   performing semantic checking of the source code containing one or more explicit design pattern source code tokens using the parser;
   performing variable scoping of the source code containing the one or more explicit design pattern source code elements; and translating the one or more explicit design pattern source code tokens into one or more expanded design pattern source code elements using the parser and input from the node factory.

2. The method of claim 1, wherein the design pattern lexer supplement includes a list of tokens representing design pattern keywords as grammar terminals.

3. The method of claim 1, wherein the design pattern grammar extensions include keyword definitions corresponding to tokens declared in a grammar.

4. The method of claim 1, wherein the one or more design pattern nodes include one or more of singleton nodes, observer nodes, or decorator nodes.

5. The method of claim 1, wherein the parsing is performed with a parser of the compiler.

6. The method of claim 1, further comprising performing variable scoping of the source code containing one or more explicit design pattern source code tokens.

7. The method of claim 1, further comprising performing type checking of the source code containing one or more explicit design pattern source code tokens.

8. The method of claim 1, further comprising performing subsequent compiler passes of the expanded design pattern source code elements to compile the source code into compiled code.

* * * * *